(12) United States Patent
Steele et al.

(10) Patent No.: US 7,933,983 B2
(45) Date of Patent: Apr. 26, 2011

(54) METHOD AND SYSTEM FOR PERFORMING LOAD BALANCING ACROSS CONTROL PLANES IN A DATA CENTER

(75) Inventors: Doug Steele, Fort Collins, CO (US); Katherine Hogan, Fort Collins, CO (US); Rheid Schloss, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2038 days.

(21) Appl. No.: 10/320,461

(22) Filed: Dec. 17, 2002

(65) Prior Publication Data
US 2004/0117476 A1    Jun. 17, 2004

(51) Int. Cl.
*G06F 15/173* (2006.01)

(52) U.S. Cl. ........ 709/224; 709/223; 709/225; 709/226; 370/230; 370/236; 370/252; 370/254; 370/256; 370/392; 370/396; 370/401; 370/402; 370/443; 370/468

(58) Field of Classification Search .......... 709/220–221, 709/223–226, 230, 235, 239; 370/252, 254, 370/256, 392, 230, 236, 396, 401, 402, 443, 370/468
See application file for complete search history.

(56) References Cited

U.S. PATENT DOCUMENTS

| | | | | |
|---|---|---|---|---|
| 5,825,772 A * | 10/1998 | Dobbins et al. | ............... | 370/396 |
| 5,867,494 A * | 2/1999 | Krishnaswamy et al. | .... | 370/352 |
| 6,006,259 A * | 12/1999 | Adelman et al. | ............. | 709/223 |
| 6,009,103 A * | 12/1999 | Woundy | ........................ | 370/401 |
| 6,032,194 A * | 2/2000 | Gai et al. | ...................... | 709/239 |
| 6,052,733 A * | 4/2000 | Mahalingam et al. | ........ | 709/235 |
| 6,078,957 A * | 6/2000 | Adelman et al. | .............. | 709/224 |
| 6,115,378 A * | 9/2000 | Hendel et al. | ................. | 370/392 |
| 6,157,647 A * | 12/2000 | Husak | .......................... | 370/401 |
| 6,188,694 B1 * | 2/2001 | Fine et al. | ..................... | 370/402 |
| 6,205,465 B1 * | 3/2001 | Schoening et al. | ........... | 718/102 |
| 6,229,816 B1 * | 5/2001 | Damien | ........................ | 370/443 |
| 6,243,361 B1 * | 6/2001 | McMillen et al. | ............ | 370/254 |
| 6,253,334 B1 * | 6/2001 | Amdahl et al. | .................... | 714/4 |
| 6,314,460 B1 * | 11/2001 | Knight et al. | ................. | 709/220 |
| 6,331,986 B1 * | 12/2001 | Mitra et al. | ................... | 370/468 |
| 6,414,958 B1 * | 7/2002 | Specht | .................... | 370/395.53 |
| 6,456,597 B1 * | 9/2002 | Bare | .............................. | 370/252 |
| 6,473,403 B1 * | 10/2002 | Bare | ............................. | 370/236 |
| 6,480,498 B1 * | 11/2002 | Gaudet et al. | ................. | 370/402 |
| 6,490,620 B1 * | 12/2002 | Ditmer et al. | ................. | 709/224 |
| 6,490,632 B1 * | 12/2002 | Vepa et al. | .................... | 709/250 |
| 6,535,491 B2 * | 3/2003 | Gai et al. | ...................... | 370/256 |
| 6,567,377 B1 * | 5/2003 | Vepa et al. | .................... | 370/230 |
| 6,580,715 B1 * | 6/2003 | Bare | ............................. | 370/396 |
| 6,681,232 B1 * | 1/2004 | Sistanizadeh et al. | ..... | 707/104.1 |
| 6,687,245 B2 * | 2/2004 | Fangman et al. | ............. | 370/356 |
| 6,714,549 B1 * | 3/2004 | Phaltankar | .................... | 370/397 |
| 6,779,043 B1 * | 8/2004 | Crinion | ......................... | 709/249 |
| 7,068,647 B2 * | 6/2006 | Fangman et al. | ............. | 370/352 |
| 7,088,689 B2 * | 8/2006 | Lee et al. | ...................... | 370/282 |
| 2002/0026505 A1 * | 2/2002 | Terry | ............................ | 709/221 |
| 2002/0032766 A1 * | 3/2002 | Xu | ................................ | 709/223 |
| 2002/0032790 A1 * | 3/2002 | Linderman | ................... | 709/230 |

(Continued)

*Primary Examiner* — John Follansbee
*Assistant Examiner* — Saket K Daftuar

(57) ABSTRACT

A system and method analyzes resource usage within a utility data center (UDC) and recommends options to maximize efficient usage of these resources. Information is gathered about the current resources allocated to control planes within the UDC, including resource loads and threshold limits within each plane. Criteria used to analyze efficiency includes customer size and prioritization within the UDC, as well as, historical and trending information, and peak resource usage.

25 Claims, 11 Drawing Sheets

U.S. PATENT DOCUMENTS

| | | | |
|---|---|---|---|
| 2002/0049608 A1* | 4/2002 | Hartsell et al. | 705/1 |
| 2002/0078382 A1* | 6/2002 | Sheikh et al. | 713/201 |
| 2002/0152305 A1* | 10/2002 | Jackson et al. | 709/224 |
| 2003/0009559 A1* | 1/2003 | Ikeda | 709/225 |
| 2003/0120502 A1* | 6/2003 | Robb et al. | 705/1 |
| 2003/0130833 A1* | 7/2003 | Brownell et al. | 703/23 |
| 2004/0031052 A1* | 2/2004 | Wannamaker et al. | 725/61 |
| 2004/0088413 A1* | 5/2004 | Bhogi et al. | 709/226 |

\* cited by examiner

METHOD AND SYSTEM FOR PERFORMING LOAD BALANCING ACROSS CONTROL PLANES IN A DATA CENTER

BACKGROUND

Data centers and timesharing have been used for over 40 years in the computing industry. Timesharing, the concept of linking a large numbers of users to a single computer via remote terminals, was developed at MIT in the late 1950s and early 1960s. A popular timesharing system in the late 1970's to early 1980's was the CDC Cybernet network. Many other networks existed. The total computing power of large mainframe computers was typically more than the average user needed. It was therefore more efficient and economical to lease time and resources on a shared network. Each user was allotted a certain unit of time within a larger unit of time. For instance, in one second, 5 users might be allotted 200 microseconds apiece, hence, the term timesharing. These early mainframes were very large and often needed to be housed in separate rooms with their own climate control.

As hardware costs and size came down, mini-computers and personal computers began to be popular. The users had more control over their resources, and often did not need the computing power of the large mainframes. These smaller computers were often linked together in a local area network (LAN) so that some resources could be shared (e.g., printers) and so that users of the computers could more easily communicate with one another (e.g., electronic mail, or e-mail, instant chat services as in the PHONE facility available on the DEC VAX computers).

As the Information Technology (IT) industry matured, software applications became more memory, CPU and resource intensive. With the advent of a global, distributed computer networks, i.e., the Internet, more users were using more software applications, network resources and communication tools than ever before. Maintaining and administering the hardware and software on these networks could be a nightmare for a small organization. Thus, there has been a push in the industry toward open applications, interoperable code and a re-centralization of both hardware and software assets. This re-centralization would enable end users to operate sophisticated hardware and software systems, eliminating the need to be entirely computer and network literate, and also eliminating direct maintenance and upgrade costs.

With Internet Service Providers (ISPs), Application Service Providers (ASPs) and centralized Internet and Enterprise Data Centers (IDCs), or Network Operation Centers (NOCs), the end user is provided with up-to-date hardware and software resources and applications. The centers can also provide resource redundancy and "always on" capabilities because of the economies of scale in operating a multi-user data center.

Thus, with the desire to return to time and resource sharing among enterprises (or organizations), in the form of IDCs and NOCs, there is a need to optimize the center's resources while maintaining a state-of-the-art facility for the users. There is also a need to provide security and integrity of individual enterprise data and ensure that data of more than one enterprise, or customer, are not co-mingled. In a typical enterprise, there may be significant downtime of the network while resources are upgraded or replaced due to failure or obsolescence. These shared facilities must be available 24-7 (i.e., around the clock) and yet, also be maintained with state-of-the art hardware and software.

A typical IDC of the prior art consists of one or more separate enterprises. Each customer leases a separate LAN within the IDC, which hosts the customer's enterprise. The individual LANs may provide always-on Internet infrastructure (AOII), but require separate maintenance and support. When an operating system requires upgrade or patching, each system must be upgraded separately. This can be time intensive and redundant.

There are a number of tools and systems in the prior art for measuring performance and run time metrics of systems. These tools typically analyze only performance criteria in a single enterprise. Optimal resource sharing among enterprises in a data center has not been implemented. An attribute of a data center environment is that the computing resources are most often "replaceable units" that can be easily substituted for each other. Further, some components of the data center have excess capacity and could be shared.

SUMMARY

According to one embodiment of the present invention, a data center has an actual network of resources with one or more virtual networks within it. Any enterprise customer may use any given resource as if the resource were located on a physical local area network (LAN) separable from other data center resources. The resources are connected to one or more control planes, or trusted domains. A control plane automatically manages enterprise resources and identifies which resources are dedicated to which enterprise within the control plane. A typical resource is allocated to a single enterprise. However, for resources that can be segmented, different enterprises may share the resource and be allocated a dedicated partition of that resource, e.g., storage banks with physical disk partitions.

The one or more control planes are connected to a Network Operation Center (NOC) system, which oversees and monitors the entire data center. The control plane helps to manage and control the always-on aspects of the enterprises. The NOC is connected to the control planes for monitoring and further oversight control, through one or more firewalls.

Support level monitoring tools, or measurement tools, are deployed to the control planes and network resources upon deployment of the UDC. Additional measurement tools can be deployed by a NOC operator at any time after deployment of the UDC. Performance measures for each mini data center, or virtual local area network (VLAN), in a control plane are collected. Network traffic measurements are also collected throughout the UDC. Each control plane analyzes the performance metrics for the resources within in its control. If load balancing among the VLANs is desired, resources are automatically reallocated throughout the control plane, if authorized. If network resources throughout the UDC are allocated sub-optimally, then a NOC operator is notified and resources are adjusted accordingly.

DESCRIPTION OF THE DRAWINGS

The detailed description will refer to the following drawings, wherein like numerals refer to like elements, and wherein.

DETAILED DESCRIPTION

An embodiment of the present invention combines existing support tools/agents with AOII (Always On Internet Infrastructure) technology in a Utility Data Center (UDC) to recognize and deploy message/data traffic through to virtual customer enterprises. The AOII technology uses a control plane, or communication and control layer, to control resources and message/data traffic among the UDC resources. The control plane manages the virtual local area networks (VLANs) that comprise a set of mini-data centers (MDCs), or customer enterprises. These capabilities are leveraged to deploy pre-packaged and/or customized support tools to an end-customer. This presents a clear business advantage in terms of cost reduction of support. End-customers no longer need to install and maintain support tools. This can be accomplished via the mid-customer, or UDC owner/operator. Additionally, maintenance of the support toolset can be done by the mid-customer providing economy of scale.

An advantage of an "always-on" infrastructure is hardware and software redundancy. If a component fails, the AOII will automatically switch out the failed component with a redundant unit. The AOII keeps track of which applications are configured on which hardware, and which ones are active. The network is monitored constantly for status. An example of a current system which will monitor an enterprise and assist in swapping out failed components is MC/ServiceGuard, available from Hewlett-Packard Company. AOII systems in the prior art are specific to an enterprise. Thus, each enterprise had to be monitored and maintained separately. An embodiment of the present invention promotes optimal resource use by creating virtual LANs (VLANs) within the UDC (or control plane) network.

Figure 1:
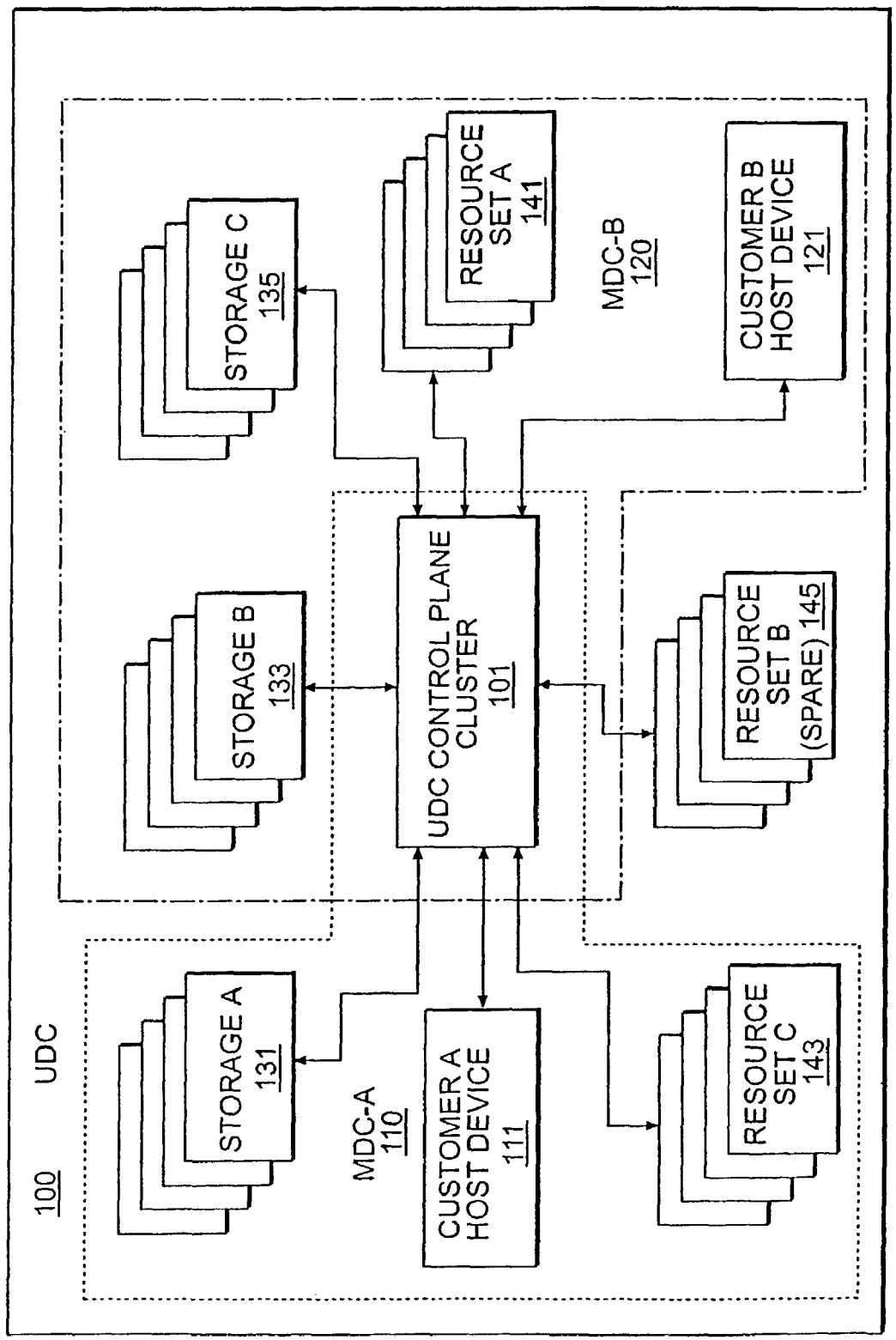
FIG. 1 is a block diagram showing an embodiment of a Utility Data Center (UDC) with virtual local area networks (VLANs)

Referring now to the drawings, and in particular to FIG. 1, there is shown a simplified embodiment of a UDC 100 with two VLANs, or mini-data centers (MDCs) 110 and 120. MDC-A 110 comprises a host device 111; resources 143; and storage 131. MDC-B 120 comprises a host device 121; resources 141; and storage 133 and 135. A UDC control plane manager 101 controls the virtual MDC networks. Spare resources 145 are controlled by the control plane manager 101 and assigned to VLANs, as necessary. A UDC control plane manager 101 may comprise a control plane database, backup management server, tape library, disk array, network storage, power management appliance, terminal server, SCSI gateway, and other hardware components, as necessary.

The entire UDC network here is shown as an Ethernet hub network with the control plane manager in the center, controlling all other enterprise devices. It will be apparent to one of ordinary skill in the art that other network configurations may be used, for instance, a daisy chain configuration.

In this embodiment, one control plane manager 101 controls MDC-A 110 and MDC-B 120. In systems of the prior art, MDC-A and MDC-B would be separate enterprise networks with separate communication lines and mutually exclusive storage and resource devices. In the embodiment of FIG. 1, the control plane manager 101 controls communication between the MDC-A 110 and MDC-B 120 enterprises and their respective peripheral devices. This is accomplished using VLAN tags in the message traffic. A UDC may have more than one control plane controlling many different VLANs, or enterprises. The UDC is monitored and controlled at a higher level by the network operation center (NOC)(not shown).

Figure 2:
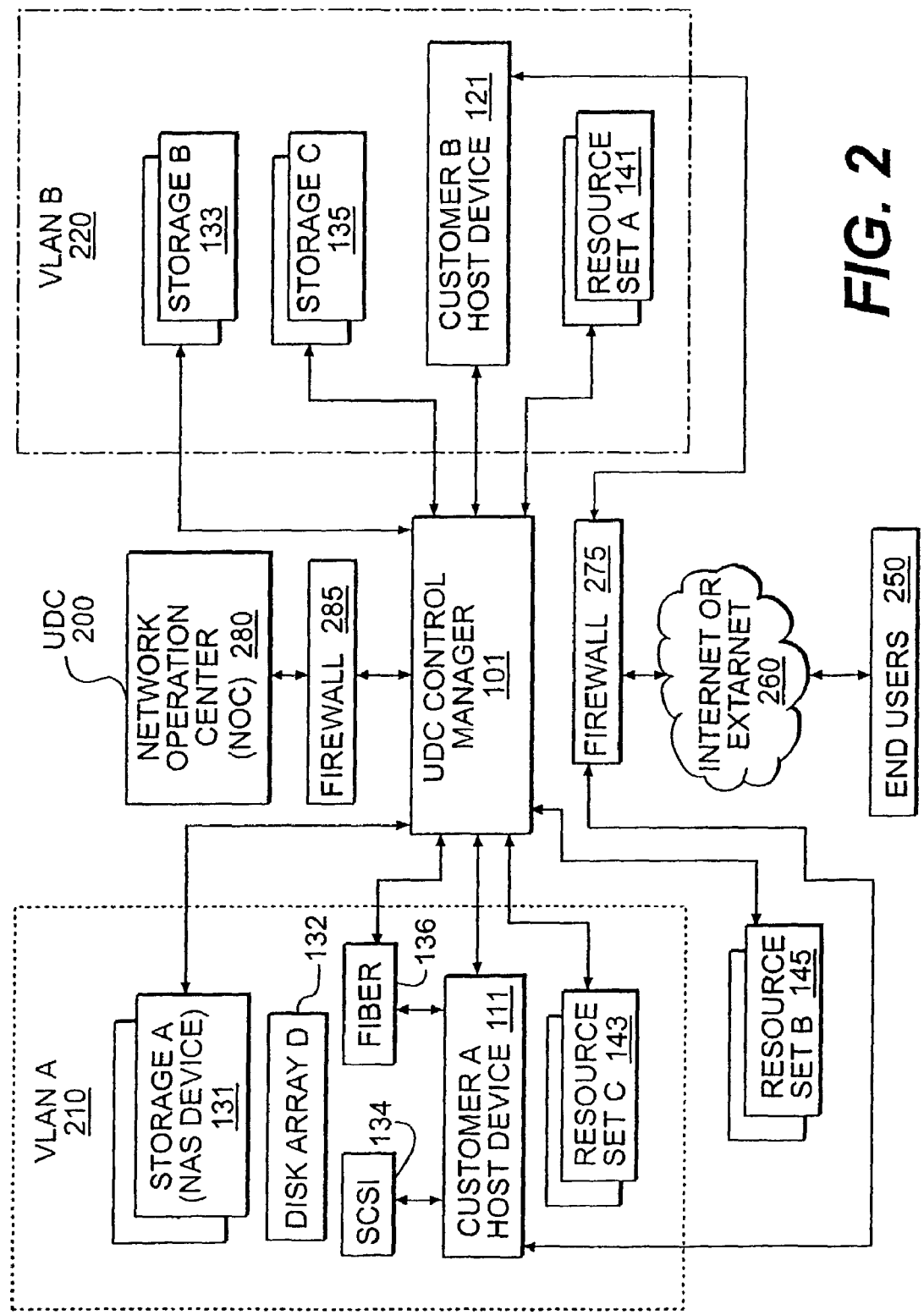
FIG. 2 is a hierarchical block diagram representing the two VLAN configurations within a UDC, as shown in FIG. 1.

Referring now to FIG. 2, there is shown an alternate hierarchical representation 200 of the two virtual networks (VLANs) in a UDC, as depicted in FIG. 1. VLAN A 210 is a hierarchical representation of the virtual network comprising MDC-A 110. VLAN B 220 is a hierarchical representation of the virtual network comprising MDC-B 120. The control plane manager 101 controls message traffic between the MDC host device(s) (111 and 121), their peripheral devices/resources (131, 132, 143, 133, 135 and 141). An optional fiber of SCSI (small computer system interface) network 134, 136 may be used so that the VLAN can connect directly to storage device 132. The fiber network is assigned to the VLAN by the control plane manager 101. The VLANs can communicate to an outside network, e.g., the Internet 260, directly through a firewall 275. It will be apparent to one of ordinary skill in the art that the enterprises could be connected to the end user 250 through an intranet, extranet or another communication network. Further, this connection may be wired or wireless, or a combination of both.

The control plane manager 101 recognizes the individual VLANs and captures information about the resources (systems, routers, storage, etc.) within the VLANs through a software implemented firewall. It monitors support information from the virtual enterprises (individual VLANs). The control plane manager also provides proxy support within the UDC control plane firewall 275 which can be utilized to relay information to and from the individual VLANs. It also supports a hierarchical representation of the virtual enterprise, as shown in FIG. 2. An advantage of a centralized control plane manager is that only one is needed for multiple VLANs. Prior art solutions required a physical support node for each virtual enterprise (customer) and required that support services be installed for each enterprise.

The network operation center (NOC) 280 is connected to the UDC control plane manager 101 via a firewall 285. The UDC control plane manager 101 communicates with the VLANs via a software implemented firewall architecture. In systems of the prior art, the NOC could not support either the control plane level or the VLAN level because it could not monitor or maintain network resources through the various firewalls. An advantage of the present invention is that the NOC 280 is able to communicate to the control plane and VLAN hierarchical levels of the UDC using the same holes, or trusted ports, that exist for other communications. Thus, an operator controlling the NOC 280 can install, maintain and reconfigure UDC resources from a higher hierarchical level than previously possible. This benefit results in both cost and time savings because multiple control planes and VLANs can be maintained simultaneously.

Figure 3:
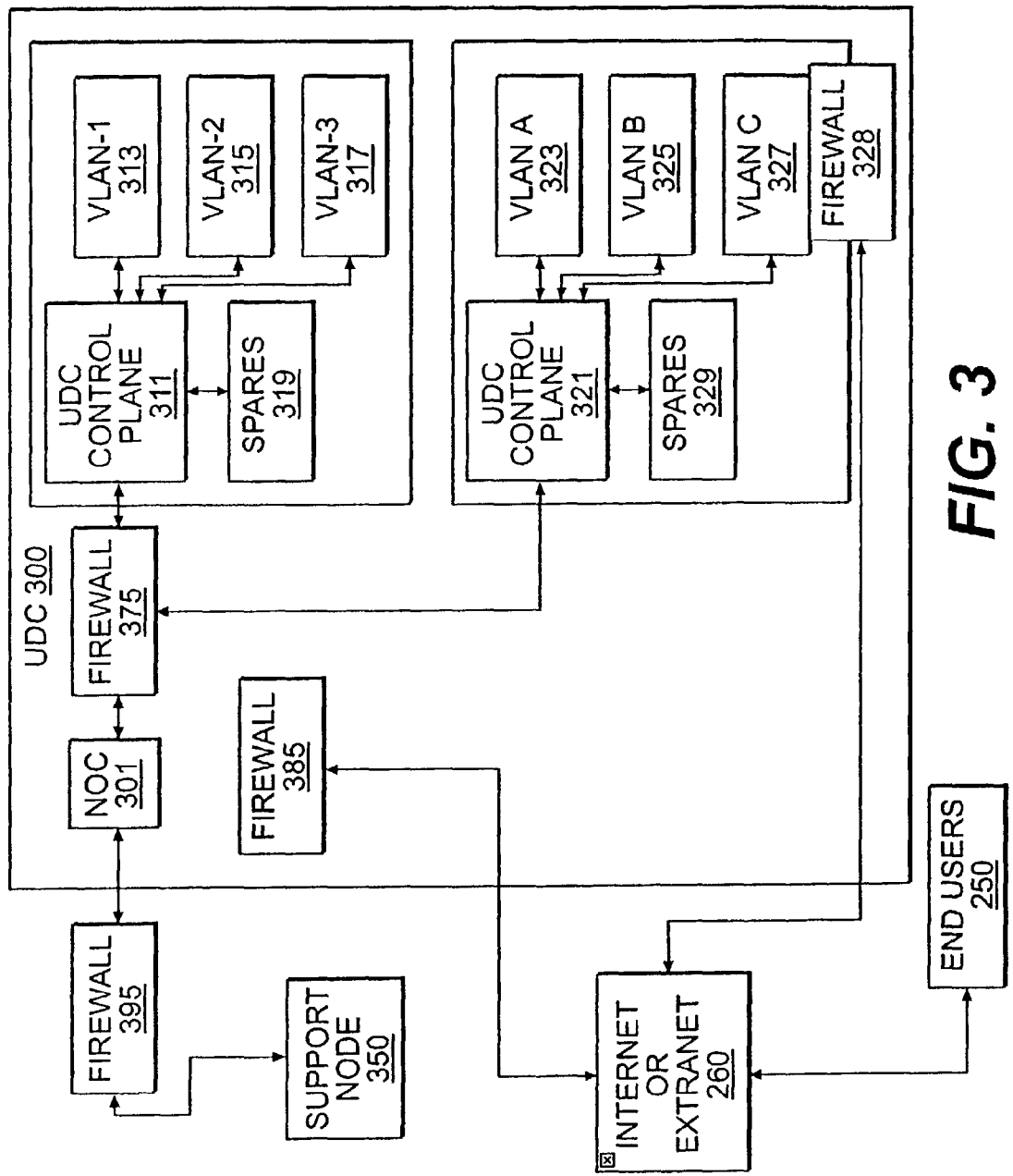
FIG. 3 is a block diagram of an embodiment of a UDC with multiple control planes with oversight by a NOC, and supported by an outside entity.

Referring now to FIG. 3, there is shown a simplified UDC 300 with multiple control plane managers 311 and 321 controlling several VLANs 313, 315, 317, 323, 325, and 327. In addition, the control planes control spare resources 319 and 329. A higher level monitoring system, also known as a network operation center (NOC) 301, is connected to the control planes 311 and 321 via a firewall 375. A VLAN can be connected to an outside network through a firewall as shown at VLAN C 327 and firewall 328. The NOC 301 has access to information about each VLAN 313, 315, 317, 323, 325 and 327 via a virtual protocol network (VPN). Typically, a human operator will operate the NOC and monitor the entire UDC. The operator may request that a control plane 311 reconfigure its virtual network based on performance analysis, or cost benefit analysis. The present system and method also allows for automatic reconfiguration.

For example, if a resource dedicated to VLAN-1 (313) fails, the control plane 311 will automatically switch operation to a redundant resource. Because the network uses an always-on infrastructure, it is desirable to configure a spare from the set of spares 319 to replace the faulty resource, as a new redundant dedicated resource. In systems of the prior art, this enterprise would be monitored and maintained separately. In this embodiment, the NOC 301 monitors the control planes 311 and 321, as well as, the VLANs 313, 315, 317, 323, 325 and 327. Thus, if none of the spares 319 are viable substitutions for the failed component, the NOC operator can enable one of the spares 329 to be used for control plane 311 rather than control plane 321. Depending on the physical configuration of the UDC, this substitution may require a small update in the VLAN configurations of each VLAN, or may require a cable change and then a VLAN configuration change.

Because one centralized control system (NOC 301) is used to monitor and route traffic among several VLANs a high availability observatory (HAO) facility can monitor the entire UDC at once. Systems of the prior art use HAO's at an enterprise level, but the HAO could not penetrate between the network hierarchies from a control plane level to the enterprise level. The present system and method has the advantage that problems with components of any enterprise, or VLAN, within the UDC can be predicted and redundant units within the UDC can be swapped and repaired, even between and among different control planes and VLANs, as necessary. The HAO facility would predict problems, while a facility such as MC/ServiceGuard, available from Hewlett-Packard Company, would facility the swapping of redundant units. If an enterprise is not required to be "always-on" it can operate without redundant units. However, during planned and unplanned system maintenance, the system, or portions of the system may be unavailable. Maintenance and support costs will be favorably affected by the use of the NOC regardless of the always-on capabilities of the individual enterprises.

In an embodiment, the HAO performs two tasks. First, once each day, a remote shell, or execution, (remsh) is launched out to each client/component in the UDC that has been selected for monitoring. The remsh gathers many dozens of configuration settings, or items, and stores the information in a database. Examples of configuration items are: installed software and version, installed patches or service packs, work configuration files, operating configuration files, firmware versions, hardware attached to the system, etc. Analysis can then be performed on the configuration data to determine correctness of the configuration, detect changes in the configuration from a known baseline, etc. Further, a hierarchy of the UDC can be ascertained from the configuration data to produce a hierarchical representation such as shown in FIG. 2. Second, a monitoring component is installed on each selected component in the UDC. The monitoring components send a notification whenever there is a hardware problem. For instance, a memory unit may be experiencing faults, or a power supply may be fluctuating and appear to be near failure. In this way, an operator at the NOC 301 level or support node 350 level can prevent or mitigate imminent or existing failures. It will be apparent to one skilled in the art that a monitoring component can be deployed to measure any number of metrics, such as performance, integrity, throughput, etc. For instance, performance measurements are collected to assist in rebalancing loads throughout the data center.

This monitoring and predictive facility may be combined with a system such as MC/ServiceGuard. In systems of the prior art, MC/ServiceGuard runs at the enterprise level. If a problem is detected on a primary system in an enterprise, a fail over process is typically performed to move all processes from the failed, or failing, component to a redundant component already configured on the enterprise. Thus, the HAO monitors the UDC and predicts necessary maintenance or potential configuration changes. If the changes are not made before a failure, the MC/ServiceGuard facility can ensure that any downtime is minimized. Some enterprise customers may choose not to implement redundant components within their enterprise. In this case, oversight of the enterprise at the NOC or support node level can serve to warn the customer that failures are imminent, or that performance thresholds are being approached, and initiate maintenance or upgrades before a debilitating failure.

In current systems, an NOC (301) could not monitor or penetrate through the firewall to the control plane cluster layer (311, 321), or to the enterprise layer (VLAN/MDC 313, 315, 317, 323, 325, 327). In contrast, the present system and method is able to deploy agents and monitoring components at any level within the UDC. Thus, the scope of service available with an HAO is expanded. The inherent holes in the communication mechanisms used to penetrate the firewalls are used.

In an exemplary embodiment, the communication mechanism is XML (eXtended Markup Language) wrapped HTTP (hypertext transfer protocol) requests that are translated by the local agents into the original HAO support actions and returned to the originating support request mechanism. HTTP may be used for requests originating from outside the customer enterprise. SNMP (simple network management protocol) may be used as a mechanism for events originating within the customer enterprise. This and other "client originated events" can be wrapped into XML objects and transported via HTTP to the support node 350. In alternative embodiments, the support node 350 can be anywhere in the UDC, i.e. at the control plane level NOC level, or even external to the UDC, independent of firewalls.

The purpose of a firewall is to block any network traffic coming through. Firewalls can be programmed to let certain ports through. For instance, a firewall can be configured to allow traffic through port 8080. HTTP (hypertext transfer protocol) messages typically use port 8080. In systems of the prior art, an HAO is configured to communicate through many ports using remote execution and SNMP communication mechanisms. These mechanisms are blocked by the default hardware and VLAN firewalls. In the present system and method, a single port can be programmed to send HAO communications through to the control plane and enterprise layers. Fewer holes in the firewall are preferred, for ease of monitoring, and minimization of security risks.

Similar to the architecture of SOAP (Simple Object Access Protocol), a series of messages or requests can be defined to proxy support requests through firewalls. An example is a "configuration collection request." The collection request is encapsulated in an XML document sent via HTTP through the firewall to the local agent within the firewall. The local agent does the collection via remsh as is done in the existing HAO. The remsh is performed within a firewall and not blocked. The results of the request are packaged up in an XML reply object and sent back through the firewall to the originating requesting agent.

Referring again to FIG. 2, the control plane can provide proxy support within the UDC control plane firewall 285. For instance, 10-15 different ports might be needed to communicate through the firewall 275. It is desirable to reduce the number of ports, optimally to one. A proxy mechanism on each side reduces the number of required ports, while allowing this mechanism to remain transparent to the software developed using multiple ports. This enables each VLAN to use a different port, as far as the monitoring tools and control software is concerned. Thus, the existing tools do not need to be recoded to accommodate drilling a new hole through the firewall each time a new VLAN is deployed.

Another example is an event generated within a control plane. A local "event listener" can receive the event, translate it into an XML event object, and then send the XML object through the firewall via HTTP. The HTTP listener within the NOC can accept and translate the event back into an SNMP event currently used in the monitoring system.

An advantage of the UDC architecture is that a baseline system can be delivered to a customer as a turnkey system. The customer can then add control plane clusters and enterprises to the UDC to support enterprise customers, as desired. However, the UDC operator may require higher-level support from the UDC developer. In this case, a support node 350 communicates with the NOC 301 via a firewall 395 to provide support. The support node monitors and maintains resources within the UDC through holes in the firewalls, as discussed above. Thus, the present system and method enables a higher level of support to drill down their support to the control plane and VLAN levels to troubleshoot problems and provide recommendations. For instance, spare memory components 319 may exist in the control plane 311. The support node 350 may predict an imminent failure of a memory in a specific enterprise 313, based on an increased level of correction on data retrieval (metric collected by a monitoring agent). If this spare 319 is not configured as a redundant component in an enterprise, a system such as MC/ServiceGuard cannot swap it in. Instead, the support node 350 can deploy the changes in configuration through the firewalls, and direct the control plane cluster to reconfigure the spare memory in place of the memory that will imminently fail. This method of swapping in spares saves the enterprise customers from the expense of having to maintain additional hardware. The hardware is maintained at the UDC level, and only charged to the customer, as needed.

Figure 4:
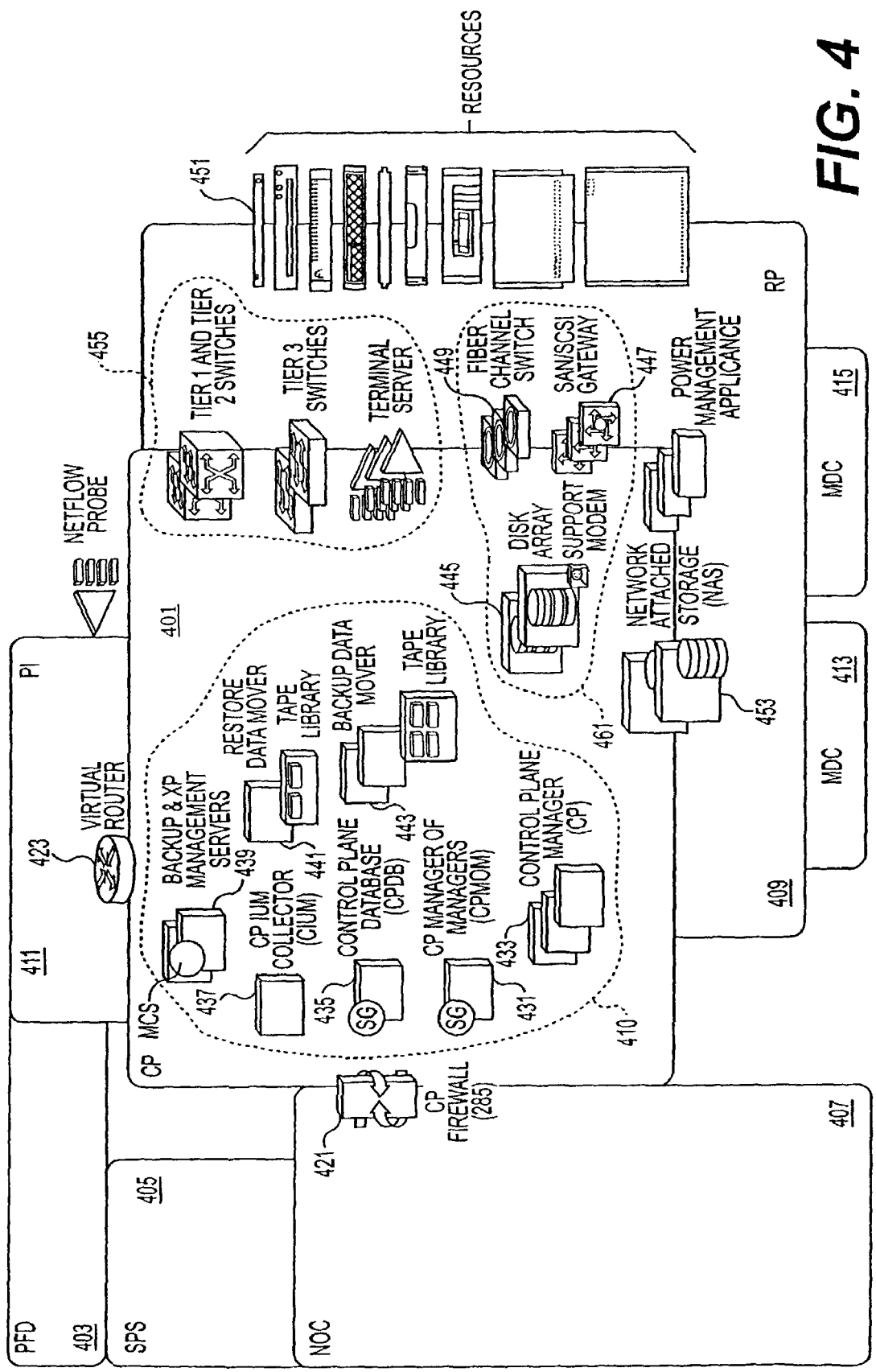
FIG. 4 is a block diagram of an embodiment of a control plane management system of a UDC.

Referring now to FIG. 4, there is shown a more detailed view of an embodiment of a control plane management system (410, comprising: 431, 433, 435, 437, 439, 441, and 443) (an alternative embodiment to the control plane manager of FIGS. 1, 2 and 3) within a UDC 400. Several components of the UDC are shown, but at different levels of detail. In this figure, adjacent components interface with one another. The control plane (CP) 401 is shown adjacent to the public facing DMZ (PFD) 403, secure portal segment (SPS) 405, network operation center (NOC) 407, resource plane (RP) 409 and the Public Internet (PI) 411. The various virtual LANs, or mini-data centers (MDC) 413 and 415 are shown adjacent to the resource plane 409 because their controlling resources, typically CPUs, are in the RP layer.

The control plane 401 encompasses all of the devices that administer or that control the VLANs and resources within the MDCs. In this embodiment, the CP 401 interacts with the other components of the UDC via a CP firewall 421 for communication with the NOC 407; a virtual router 423 for communicating with the PI 411; and a number of components 455 for interacting with the resource plane (RP) 409 and MDCs 413, 415. A control plane manager of managers (CP-MOM) 431 controls a plurality of control plane managers 433 in the CP layer 401. A number of components are controlled by the CPMOM 431 or individual CP 433 to maintain the virtual networks, for instance, CP Database (CPDB) 435; Control Plane Internet Usage Metering (CP IUM) Collector (CPIUM) 437, using Netflow technology (for instance, Cisco IOS Netflow, available from Cisco Systems, Inc.) on routers to monitor paths of traffic; backup and XP management servers 439; restore data mover and tape library 441; and backup data mover and tape library 443. These devices are typically connected via Ethernet cables and together with the CPMOM 431 and CP manager 433 encompass the control plane management system (the control plane manager of FIGS. 1-3). There may be network attached storage (NAS) 453 which is allocated to a VLAN by the CP manager, and/or disk array storage 445 using either SCSI or fiber optic network connections and directly connected to the resources through fiber or SCSI connections. The disk array 445, fiber channel switches 449, and SAN/SCSI gateway 447 exist on their own fiber network 461. The resources 451 are typically CPU-type components and are assigned to the VLANs by the CP manager 433.

The CP manager 433 coordinates connecting the storage systems up to an actual host device in the resource plane 409. If a VLAN is to be created, the CP manager 433 allocates the resources from the RP 409 and talks to the other systems, for instance storing the configuration in the CPDB 435, etc. The CP manager 433 then sets up a disk array 445 to connect through a fiber channel switch 449, for example, that goes to a SAN/SCSI gateway 447 that connects up to resource device in the VLAN. Depending on the resource type and how much data is pushed back and forth, it will connect to its disk array via either a small computer system interface (SCSI), i.e., through this SCSI/SAN gateway, or through the fiber channel switch. The disk array is where a disk image for a backup is saved. The disk itself doesn't exist in the same realm as where the host resource is because it is not in a VLAN. It is actually on this SAN device 447 and controlled by the CP manager 433.

Things that are assigned to VLANs are things such as a firewall, that an infrastructure might be built, and a load balancer so that multiple systems can be hidden behind one IP address. The load balancer balances Internet traffic. A router could be added so that a company's private network could be added to this infrastructure. A storage system is actually assigned to a host device specifically. It is assigned to a customer, and the customer's equipment might be assigned to one of the VLANs, but the storage system itself does not reside on the VLAN. In one embodiment, there is storage that plugs into a network and that the host computer on a VLAN can access through Ethernet network. Typically, how the customer hosts are connected to the disk storage is through a different network, in one embodiment, through a fiber channel network 461. There is also a network attached storage (NAS) device 453, whereas the other storage device that connects up to the host is considered a fiber channel network storage device. The NAS storage device 453 connects through an Ethernet network and appears as an IP address on which a host can then mount a volume. All of the delivery of data is through Ethernet to that device.

The control plane manager system 410 has one physical connection for connecting to multiples of these virtual networks. There is a firewall function on the system 410 that protects VLAN A, in this case, and VLAN B from seeing each others data even though the CP manager 433 administers both of these VLANs.

Figure 5:
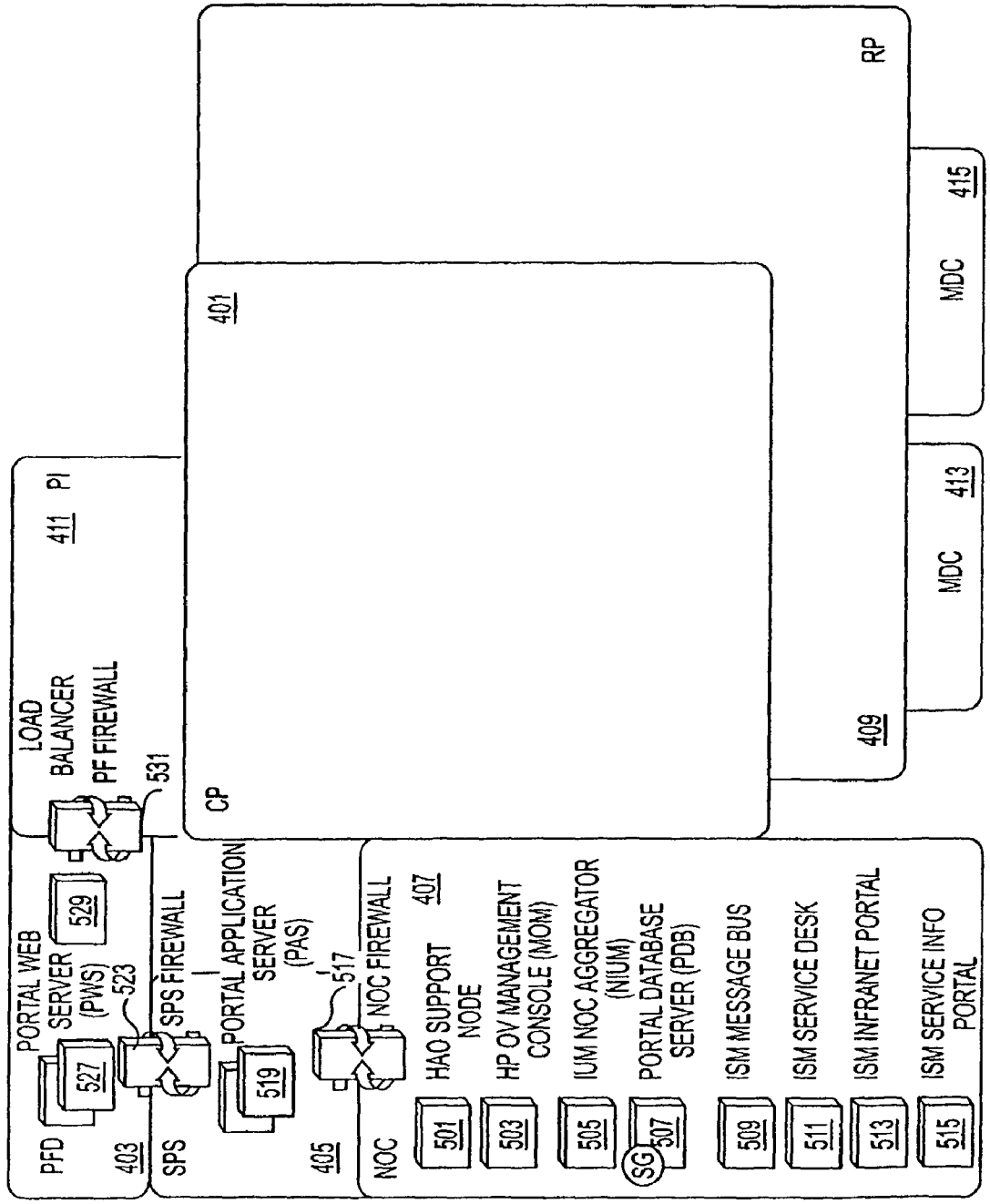
FIG. 5 is a block diagram of an embodiment of a management portal segment layer of a UDC.

Referring now to FIG. 5, there is shown a more detailed view of the NOC layer of the UDC 400. The NOC 407 is connected to the CP 401 via firewall 421 (FIG. 4). In an exemplary embodiment within the NOC 407 is a HAO support node 501, HP OpenView (OV) Management Console 503 (a network product available from Hewlett-Packard Company for use in monitoring and collecting information within the data center), IUM NOC Aggregator (NIUM) 505, portal database server (PDB) 507, ISM message bus 509, ISM service desk 511, ISM infranet portal 513, and ISM service info portal 515. The NOC 407 interfaces with the secure portal segment (SPS) 405 via a NOC firewall 517. The SPS 405 has a portal application server (PAS) 519. The SPS 405 interfaces with the public facing DMZ (PFD) 403 via a SPS firewall 523. These two firewalls 517 and 523 make up a dual bastion firewall environment. The PFD 403 has a portal web server (PWS) 527 and a load balancer 529. The PFD 503 connects to the PI 411 via a PF firewall 531.

The PFD 403, SPS 405 and NOC layer 407 can support multiple CP layers 401. The control planes must scale as the number of resources in the resource plane 409 and MDCs 413 and 415 increase. As more MDCs are required, and more resources are utilized, more control planes are needed. In systems of the prior art, additional control planes would mean additional support and controlling nodes. In the present embodiment, the multiple control planes can be managed by one NOC layer, thereby reducing maintenance costs considerably.

Figure 6:
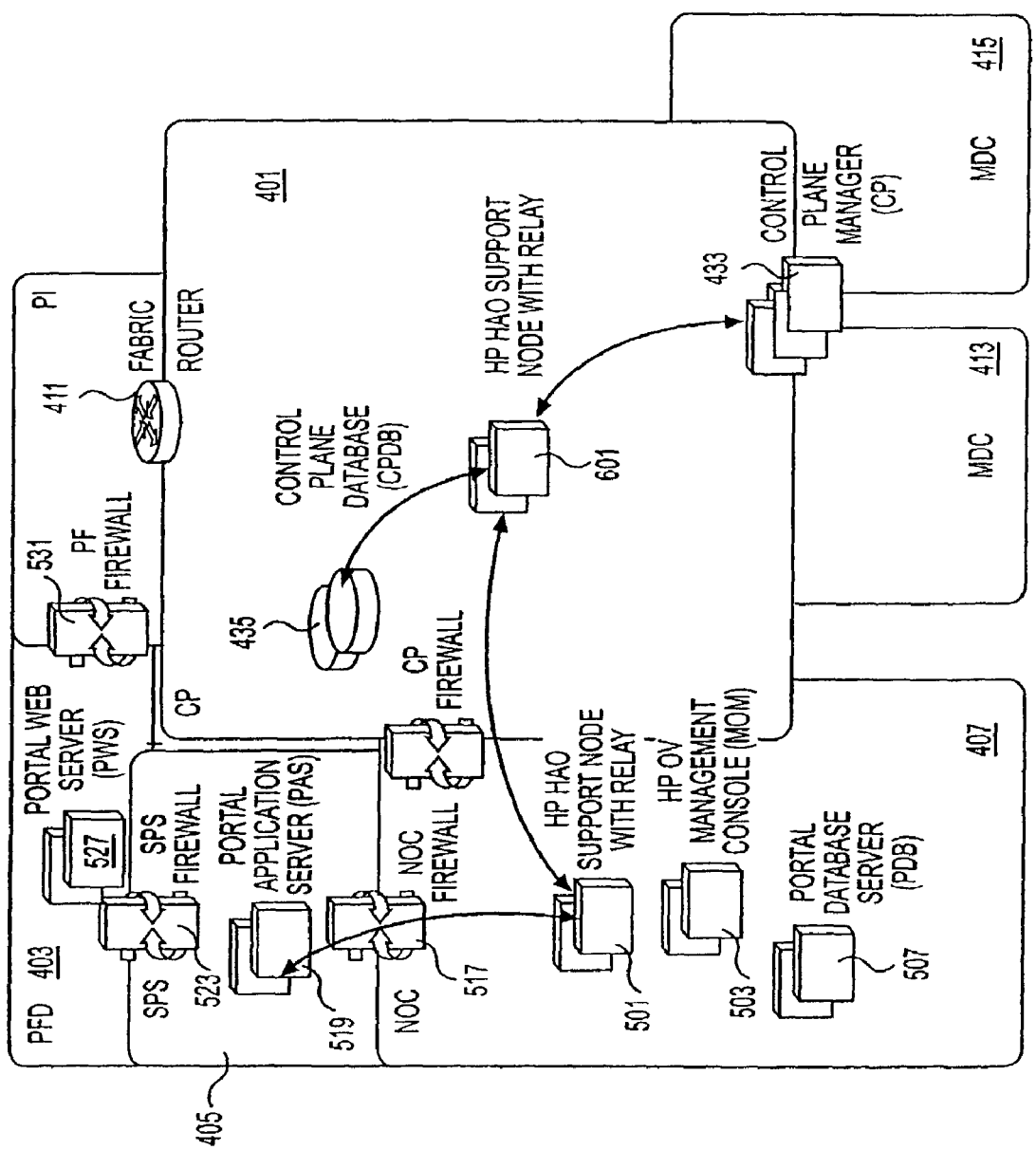
FIG. 6 is a block diagram of an embodiment of a high availability observatory (HAO) support model of a UDC.

Referring now to FIG. 6, there is shown an exemplary management structure for a high availability observatory (HAO) support model. The HP HAO support node with relay 601 has access to the control plane database (CPDB) 435 to pull inventory and configuration information, as described above for a simple UDC. The HP HAO support node 601 residing in the control plane consolidates and forwards to the NOC for the UDC consolidation. In an embodiment, a support node (SN) resides at the NOC level 501 and/or at an external level 350 (FIG. 3). The support node 601 is a virtual support node (VSN), or proxy, that listens for commands from SN 501 and performs actions on its behalf and relays the output back to SN 501 for storage or action. Each CP manager system can run multiple VSN instances to accommodate multiple VLANs, or MDCs, that it manages. The CP manager system 433 then consolidates and relays to a consolidator in the CP. The NOC support node 501 consolidates multiple CPs and provides the delivery through the Internet Infrastructure Manager (IIM) portal, also known as UDC Utility Data Center Utility Controller (UC) management software, for client access. This method can scale up or down depending on the hierarchy of the data center. For instance, a support node 350 (FIG. 3) may interact with a VSN at the NOC level in order to monitor and support the NOC level of the UDC. It may also interact with VSNs at the CP level in order to monitor and support the CP level of the UDC.

The control plane management system has one physical connection that connects to multiples of these virtual networks. There is a firewall function on the CP management system that protects VLAN A, in the exemplary embodiment, for instance, and VLAN B from seeing each other's data even though the control plane management system is administrating both of these VLANs. The VLANs themselves are considered an isolated network.

Information still needs to be communicated back through the firewall, but the information is gathered from multiple networks. The VLAN tagging piece of that gathering is the means by which this data is communicated. In the typical network environment of the prior art, there are multiple network interfaces. Thus, a system would have to have multiple cards in it for every network that it is connecting to. In the present system, the CP management system only has one connection and uses this communication gateway to see all of the networks (VLANs) and transfer information for these VLANs up to the support node by using VLAN tagging in the card.

Information can be sent back and forth from the CP management system to the VLANs, but by virtue of the protocol of the gateway, information cannot be sent from one VLAN to the other. Thus, the information remains secure. This gateway is also known as a VLAN tag card. This type of card is currently being made by 3COM and other manufacturers. The present system differs from the prior art because it securely monitors all of the HAO through this one card.

Figure 7:
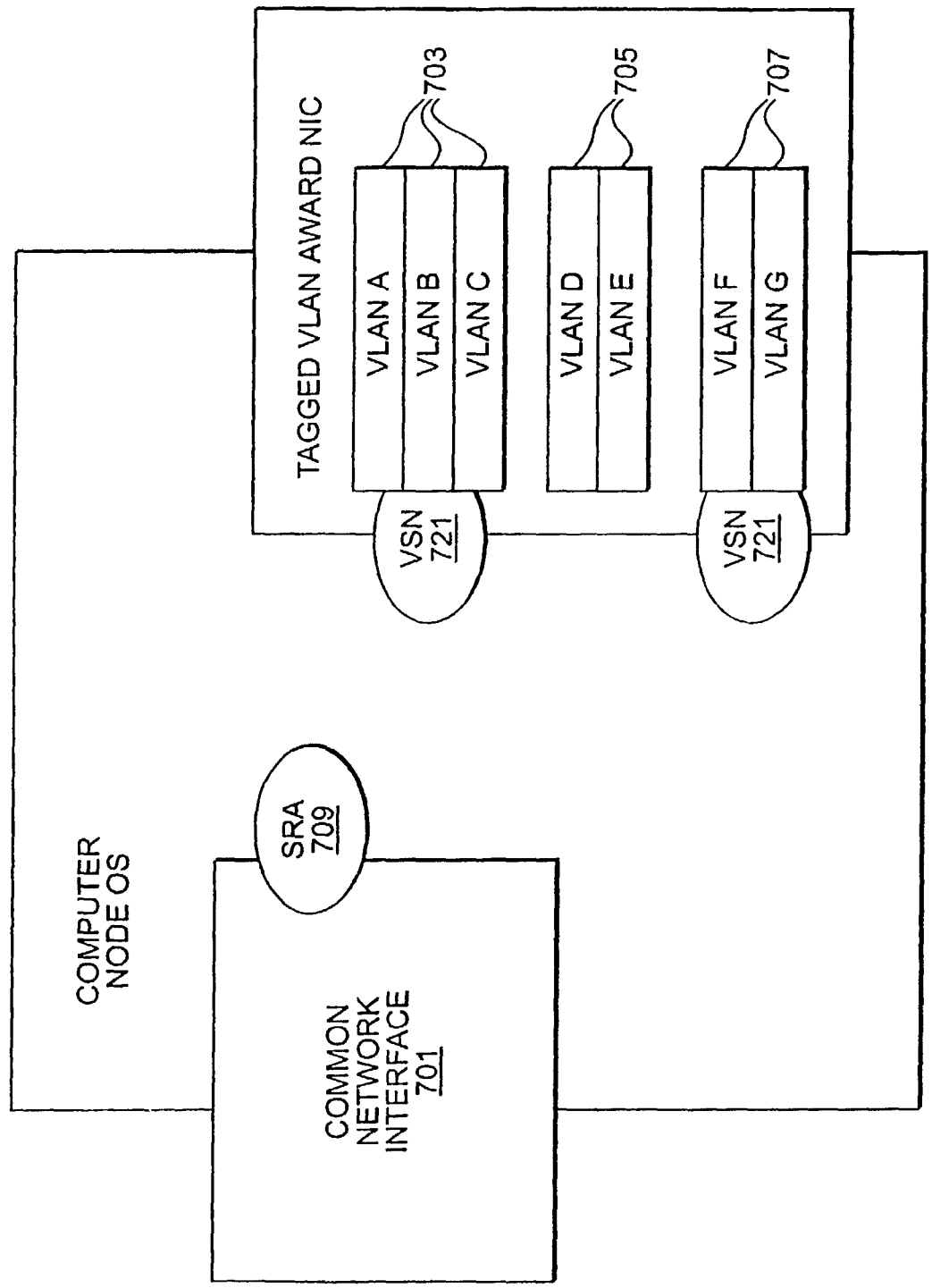
FIG. 7 is a block diagram of a virtual support node (VSN) and VLAN tagging system used to segregate the VLANs of a UDC.

Referring now to FIG. 7, there is shown the common network interface card and its interaction with the VLANs. The CP management system sees all of the resource VLANs; it has a common network interface card 701 with a firewall piece (not shown). A gateway is created with the HAO that allows it to perform the HAO support functions. The virtual support nodes (VSN) 721 connect to all of these different VLANs 703, 705, 707 through one interface. The support relay agent (SRA) 709 communicates all of the secure information through the common network interface 701. The SRA 709 is used to translate support requests specific to the virtual support nodes into "firewall save" communications. For example, HTTP requests can be made through the firewall where they get proxied to the actual support tools. The existing art of "SOAP" (Simple Object Access Protocol) is a good working example as to how this would work. This is predicated on the currently acceptable practice of allowing holes in firewalls for HTTP traffic. The virtual support node uses the industry standard and accepted protocol of HTTP to drill through the firewalls. Utilizing a SOAP type mechanism, collection requests and client-originated events are wrapped in XML objects and passed through the firewall between "HAO Proxies."

Figure 8:
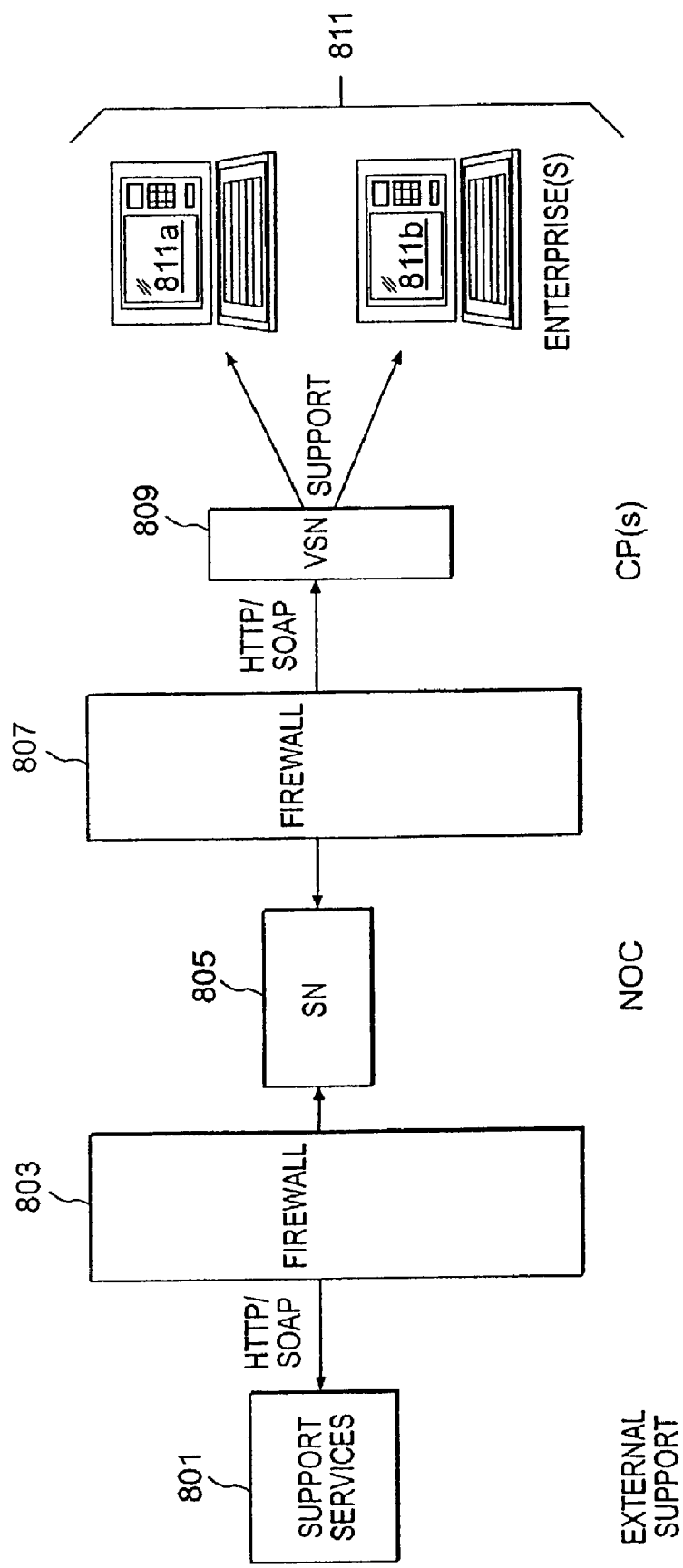
FIG. 8 is a block diagram of support services through firewalls as relates to a UDC.

Referring now to FIG. 8, there is shown a block diagram of support services through firewalls as relates to a data center. Standard support services 801 such as event monitoring and configuration gathering can be accomplished remotely in spite of the existence of firewalls 803 and 807 by using HTTP based requests. By leveraging technologies such as Simple Object Access Protocol (SOAP), the Support Node (SN) 805 can package up requests such as a collection command in an XML object. The Request can be sent to a "Support Proxy," or virtual support node (VSN) 809 on the other side of the firewall 807. A VSN 809 on the other side of the firewall 807 can translate that request into a collection command, or any other existing support request, that is run locally as though the firewall 807 was never there.

For example, a request to gather the contents of the '/etc/networkrc' file from enterprise 811a in a control plane might be desired. There is a SN 805 in the NOC and a VSN 809 inside the Control plane. The request for /etc/networkrc is made from the SN 805. The request is packaged as an XML SOAP object. The request is sent to the VSN 809 inside the CP, and through the CP's firewall (not shown). The VSN 809 hears the HTTP based SOAP request and translates it into a remote call to get the requested file from the enterprise 811*a*. The VSN 809 packages up the contents of the requested file into another XML SOAP object and sends it back to the SN 805.

Figure 9:
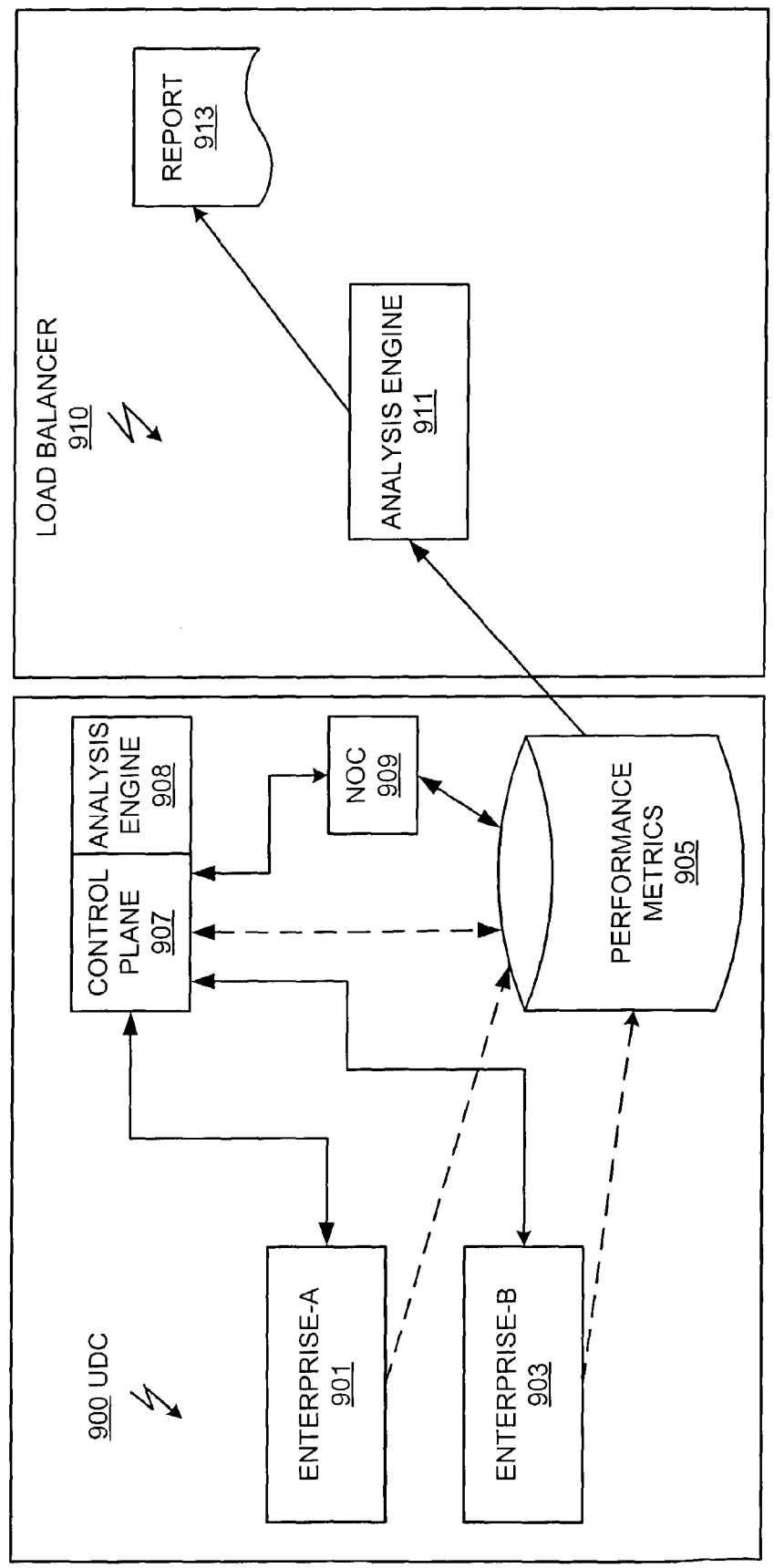
FIG. 9, is a block diagram showing an exemplary UDC having load balancing tools as described herein.

Referring now to FIG. 9, there is shown an exemplary UDC having load balancing tools as described herein. An exemplary UDC 900 has two MDCs: Enterprise A. 901 and Enterprise B 903. When the UDC 900 is deployed, the desired measurement tools (not shown) are installed on each component requiring measurement. Examples of resource monitoring tools are HP Measureware available from Hewlett-Packard Company. The Measureware agents are installed on the client. They monitor items like CPU usage, disk space usage, I/O or backbone traffic per system. The HP OpenView family of products, specifically Network Node Manager (NNM), also available from Hewlett-Packard Company, can be used to monitor network traffic throughout the UDC. At a desired periodicity, measurements are collected by the measurement tools (support level monitoring tools) and stored in one or more databases 905. It will be apparent to one of ordinary skill in the art that the performance metrics database(s) 905 can be stored as flat files, distributed across storage devices, or remain in internal memory (RAM).

In one embodiment, enterprise performance metrics 905 are retrieved by the appropriate control plane 907 and then analyzed by an analysis engine 908 to identify recommended load balancing. The analysis engine compares loads on resources and determines whether an enterprise is under-utilizing or over-utilizing VLAN resources. If, for instance, Enterprise A 901 has excess disk capacity and Enterprise B 903 has a need for disk capacity, the control plane 907 can automatically reallocate the disk drives within its control. In some cases, reallocation cannot take place at the control plane level, because sufficient resources are not available. In this case, the load balancing recommendations can be viewed at the NOC 909. It may be that one control plane has insufficient resources, but another has a glut of resources. In one embodiment, a NOC operator reallocates resources among two or more control planes within the UDC. In some cases additional resources must be deployed in the UDC to accommodate additional demand. In other cases, the monitored resources are network resources. The network resources are monitored at the NOC 909. In yet other cases, entire enterprises may be reallocated among control planes.

In another embodiment, the enterprise performance metrics 905 are retrieved by a load balancer 910 and then analyzed by an analysis engine 911 to identify recommended load balancing in a report 913. This report may be human readable, machine readable or both. In one alternative embodiment, the report is machine readable and sent to the control planes for automatic rebalancing of resources. In another alternative embodiment, the report is human readable and sent to an operator at the NOC 909 for further consideration. In the case of UDC network resources, the control planes cannot automatically rebalance UDC resources among control planes. An operator must intercede and execute recommended rebalancing.

Typically, the support level monitoring tools are installed on UDC components when the UDC is deployed. In other embodiments, enterprise customers have service level agreements (SLA) with the UDC owner/operator. In addition to voluntary rebalancing, an end-customer might have a SLA guaranteeing a specific transaction time or spare disk space. The support level monitoring tools can be deployed with the end-customer's desired thresholds to trigger either a notification message or automatic rebalancing when the threshold is reached. In another embodiment, desired pre-threshold triggers can be loaded into the analysis engine to notify an operator before a threshold is reached.

In some cases, an end-customer may have contracted for a minimal SLA that does not guarantee performance. The pre-selected triggers and thresholds can be used as a tactic when offering the end-customer increased capacity. At some point, an end-customer may require a higher level of SLA for their enterprise. In this case, the thresholds, and associated triggers, will be updated in the support level monitoring tools.

Figure 10:
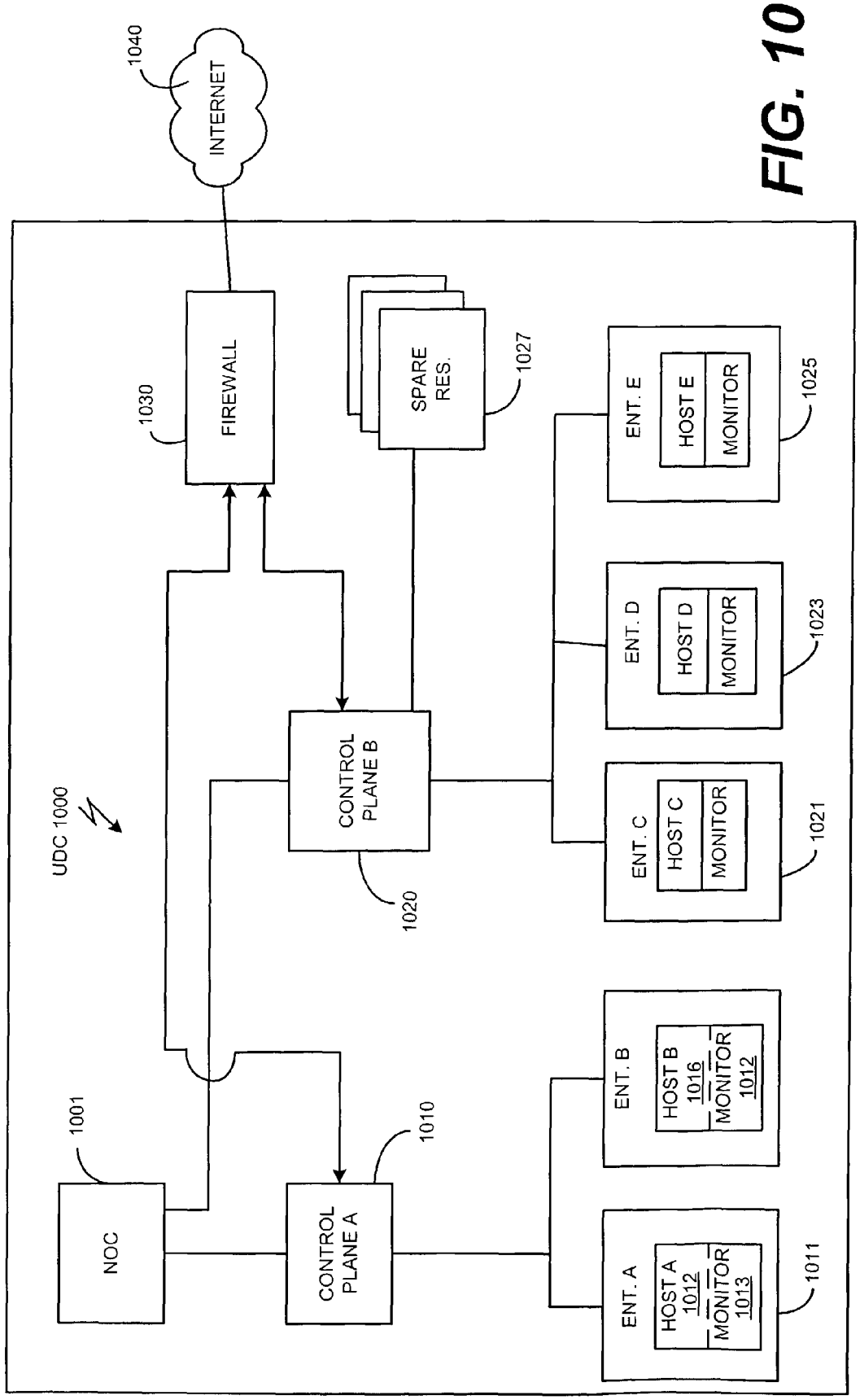
FIG. 10 is a block diagram showing the UDC of FIG. 9 with additional enterprises (VLANs) deployed and a connection to the Internet.

Referring now to FIG. 10, there is shown the UDC 900 of FIG. 9 with additional enterprises (VLANs) deployed and a connection to the Internet. UDC 1000 has a NOC 1001 monitoring two control planes A and B (1010 and 1020, respectively). Control plane A 1010 is configured with two enterprises, or VLANs: enterprise A 1011 and enterprise B 1015. Control plane B 1020 is configured with three enterprises, or VLANs: enterprise C 1021 and enterprise D 1023, and enterprise E 1025. Control plane A 1010 configures enterprises A and B according to the requirements of end-customers owning the respective enterprises. Enterprise A has a host CPU A 1012 and enterprise B has a host CPU B 1016. When the control plane A 1010 configures its resources to comprise two VLANs, i.e., enterprises A and B, it deploys the necessary support level monitoring tools 1013 and 1017 to host CPUs A and B, respectively. Similarly, control plane B 1020 controls three VLANs (1021, 1023, 1025), each having a host CPU and deployed monitoring tools. Control plane B also has spare resources 1027. The control planes are connected to the Internet 1040, or another network, through a firewall 1030.

For control plane A 1010, monitoring tools 1013, 1017 provide the control plane 1010 with performance metrics. In one embodiment, an analysis engine resides on the control plane manager A 1010 and determines whether resources should be reallocated. In one example, enterprise A and B are both near capacity for disk space. Control plane A cannot reallocate additional resources, because none are available. A message is sent to the NOC 1001 with a request for additional resources. Control plane B monitors its VLANs and determines that no reallocation is necessary. It also notifies the NOC 1001 that it has spare resources 1027. A NOC operator physically removes the appropriate resources 1027 from control plane B 1020 and connects them to the physical network for control plane A 1010. It then notifies control plane A 1010 that additional resources 1027 are available so that control plane A 1010 can reallocate the necessary resources 1027 to enterprises A and B (1011, 1015). In this way, resources can be reallocated within the UDC 1000 in a optimal fashion.

The UDC 1000 is deployed with network monitors installed, also. Traffic across firewall 1030 to the Internet 1040 is monitored. In one embodiment, NNM is used to monitor network traffic. NNM watches the amount of data or packets that go through each particular LAN card or network device in the system. An NNM agent can be deployed on each computer system in the control plane or in the MDC. Thus, overall LAN or network capacity can be monitored for a control plane, or for a control plane MDC. A variety of algorithms may be used to compare a predicted capability with an actual capability. It can then be determined whether bandwidth needs to be increased.

For instance, if network traffic is too high, a NOC operator may decide that a second firewall, or portal, to the Internet is required. Once the second firewall (not shown) is deployed, then traffic can again be monitored. It may be that control plane B 1020 sends 300% more data to/from the Internet than control plane A 1010. The NOC operator may then decide that enterprise E 1025 is over-loading control plane B's communication and it should be physically moved to the physical network of control plane A 1010. The reconfigured UDC is shown in FIG. 11.

Figure 11:
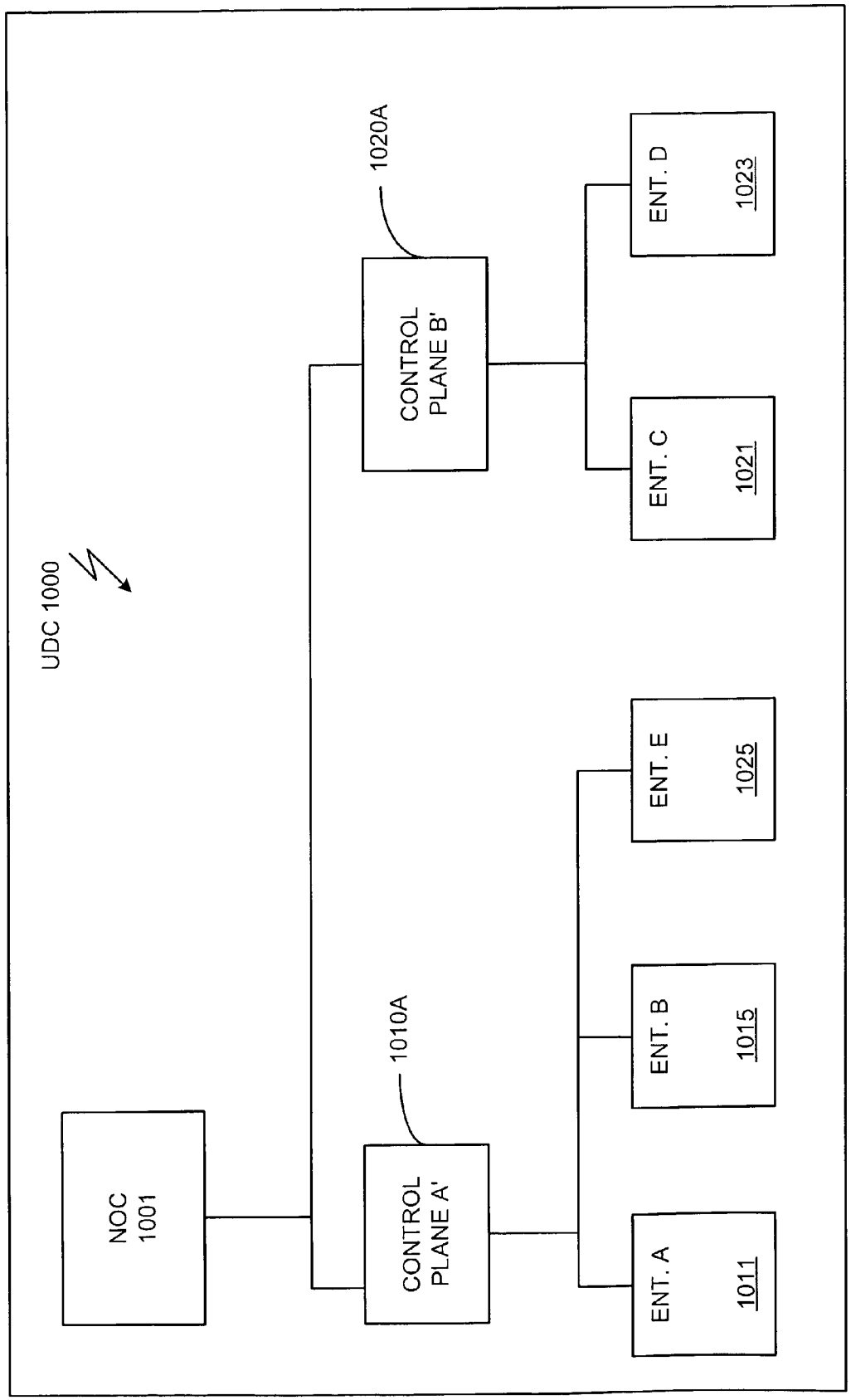
FIG. 11 is a block diagram showing an exemplary UDC with reconfigured control planes.

Referring now to FIG. 11, there is shown a reconfigured control plane A' 1010A and a reconfigured control plane B' 1020A. Control plane A' 1010A now controls enterprises A, B, and E (1011, 1015, and 1025, respectively). Control plane B' 1020A now controls enterprises C and D (1021 and 1023, respectively). Now that network traffic has equalized over the UDC resources, individual components can be balanced within each control plane, as discussed above.

The present system and method is an advantage over the prior art because a UDC can be deployed with minimal allocated resources. Data centers of the prior art must basically deploy and allocate a maximum number of resources to each MDC, or enterprise. Data centers of the prior art have no way to automatically reallocate resources among the enterprises because the individual enterprises are separate physical LANs. The present system and method allows the UDC owner/operator to use fewer overall resources. Resources do not need to be added to the control planes until performance threshold are approached. If an end-customer (enterprise owner) has contracted for a higher level of availability (in the SLA), then the UDC owner will incrementally add resources to the system, as required.

The present system and method operates efficiently because it can pass the performance information from an enterprise level to a higher level, thus allowing the resources to be properly managed. In the prior art, resources were managed only within the enterprise. The present system and method deploys a data center where the resources can automatically be managed at a higher level, rather than having someone guess at load balancing among enterprises by taking enterprise-level reports and combining them together on their desk and flipping a coin.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A system for load balancing network resources in a data center, comprising:
   a plurality of virtual local area networks (VLANs) including first and second VLANs, wherein each VLAN comprises an independent network of components associated with its respective enterprise;
   a control plane coupled to the first and second VLANs, wherein the control plane initially allocates a first set of network resources to the first VLAN and allocates a second set of network resources to the second VLAN based on enterprise requirements;
   means for collecting performance metrics from the first set of network resources and second set of network resources, wherein the collected performance metrics comprise one or more of CPU usage, memory usage and throughput; and
   means for performing load analysis using the collected performance metrics and corresponding pre-determined performance thresholds for load balancing the first and second set of network resources, wherein the control plane automatically reallocates a network resource from the first set of network resources to the second set of network resources if the collected performance metric associated with the network resource is less than its corresponding pre-determined performance threshold and if the network resource is required by the second VLAN.

2. The system as recited in claims 1, wherein the first and second set of resources comprise one or more of:
   data processing resources, memory resources, printing resources, and data communication resources.

3. The system as recited in claims 1, wherein the control plane does not reallocate the network resource from the first set of network resources to the second set of network resources if the collected performance metric associated with the network resource is at or more than its corresponding pre-determined performance threshold or if the network resource is not required by the second VLAN.

4. The system as recited in claims 1, wherein the control plane reallocates a network resource from the second set of network resources to the first set of network resources if the collected performance metric associated with the network resource from the first set of network resources is at or more than its corresponding pre-determined performance threshold and if the network resource from the second set of network resources not required by the second VLAN.

5. The system as recited in claims 1, wherein the control plane automatically reallocates the network resource from the first set of network resources to the second set of network resources only if such reallocation is authorized.

6. The system as recited in claim 1, further comprising:
   a monitoring tool to measure performance metrics associated with each resource from the first and second set of resources, wherein the monitoring tool provides the performance metrics to the means for collecting performance metrics.

7. The system as recited in claim 6, wherein the monitoring tool includes at least one tool selected from the group consisting of: CPU usage monitor, disk usage monitor, throughput monitor, Input/output (I/O) monitor, and network traffic monitor.

8. The system as recited in claim 1, further comprising:
   a network operations center (NOC) coupled to a plurality of control planes, wherein the NOC communicates with the plurality of control planes through one or more firewalls and wherein the NOC allocates resources between the plurality of control planes.

9. The system as recited in claim 8, further comprising:
   a control plane management system associated with the control plane, wherein the NOC communicates with first and second set of resources using the control plane management system and wherein the NOC comprises:
   means for collecting network performance metrics from the plurality of control planes; and
   means for load analysis across the plurality of control planes using the collected network performance metrics from the resources and corresponding pre-determined performance thresholds; and
   means for allocating resources across the plurality of control planes.

10. The system as recited in claim 9, wherein an operator reallocates resources across the plurality of control planes based on the collected network performance metrics.

11. The system as recited in claim 1, wherein an enterprise is notified before the control plane reallocates the network resource.

12. The system as recited in claim 1, wherein the pre-determined performance thresholds are selected in a service level agreement between an enterprise and the data center.

13. A non-transitory machine-readable storage medium having stored thereon a plurality of executable instructions to implement a method for load balancing resources among virtual local area networks (VLANs), the method comprising:
   allocating a first set of network resources to a first VLAN;
   allocating a second set of network resources to a second VLAN, wherein the first set of network resources and the second set of network resources are allocated based on enterprise requirements;
   collecting performance metrics from the first set of network resources and the second set of network resources, wherein the collected performance metrics comprise CPU usage, memory usage and throughput;
   performing load analysis using the collected performance metrics and corresponding pre-determined performance thresholds for load balancing the first and second set of network resources; and
   reallocating automatically a network resource from the first set of network resources to the second set of network resources if the collected performance metric associated with the network resource is less than its corresponding pre-determined performance threshold and if the network resource is required by the second VLAN.

14. The non-transitory machine-readable storage medium of claim 13, the method further comprising: terminating the reallocating step if the collected performance metric associated with the network resource is at or more than its corresponding pre-determined performance threshold or if the network resource is not required by the second VLAN.

15. The non-transitory machine-readable storage medium of claim 13, the method further comprising: reallocating a network resource from the second set of network resources to the first set of network resources if the collected performance metric associated with the network resource from the first set of network resources is more than its corresponding pre-determined performance threshold and if the network resource from the second set of network resources not required by the second VLAN.

16. The non-transitory machine-readable storage medium of claim 13, the method further comprising: reallocating automatically the network resource from the first set of network resources to the second set of network resources only if such reallocation is authorized.

17. The non-transitory machine-readable storage medium of claim 13, the method further comprising: measuring performance metrics associated with each network resource from the first and second set of network resources.

18. The non-transitory machine-readable storage medium of claim 13, the method further comprising: allocating network resources between a plurality of control planes by a network operations center (NOC).

19. The non-transitory machine-readable storage medium of claim 18, the method further comprising: communicating by the NOC with the plurality of control planes through one or more firewalls.

20. The non-transitory machine-readable storage medium of claim 18, the method further comprising: collecting network performance metrics from the plurality of control planes; and, performing load analysis across control planes using the collected network performance metrics from the network resources and corresponding pre-determined performance thresholds; and allocating network resources across control planes.

21. The non-transitory machine-readable storage medium of claim 18, the method further comprising: reallocating resources by an operator across the plurality of control planes based on the collected network performance metrics.

22. The non-transitory machine-readable storage medium of claim 13, the method further comprising: notifying an enterprise before the control plane reallocates the network resource.

23. A system for load balancing network resources in a data center, comprising:
   a plurality of virtual local area networks (VLANs) including first and second VLANs, wherein each VLAN comprises an independent network of components associated with its respective enterprise;
   a control plane coupled to the first and second VLANs, wherein the control plane initially allocates a first set of network resources to the first VLAN and allocates a second set of network resources to the second VLAN based on enterprise requirements and wherein the first and second set of resources comprise one or more of data processing resources, memory resources, printing resources, and data communication resources;
   a load balancer, wherein the load balancer collects performance metrics from the first set of network resources and second set of network resources and wherein the collected performance metrics comprise one or more of CPU usage, memory usage and throughput; and
   an analysis engine, wherein the analysis engine performs load analysis using the collected performance metrics and corresponding pre-determined performance thresholds for load balancing the first and second set of network resources and wherein the control plane automatically reallocates a network resource from the first set of network resources to the second set of network resources if the collected performance metric associated with the network resource is less than its corresponding pre-determined performance threshold and if the network resource is required by the second VLAN.

24. The system as recited in claims 23, wherein the control plane does not reallocate the network resource from the first set of network resources to the second set of network resources if the collected performance metric associated with the network resource is at or more than its corresponding pre-determined performance threshold or if the network resource is not required by the second VLAN.

25. The system as recited in claims 23, wherein the control plane reallocates a network resource from the second set of network resources to the first set of network resources if the collected performance metric associated with the network resource from the first set of network resources is at or more than its corresponding pre-determined performance threshold and if the network resource from the second set of network resources not required by the second VLAN.

* * * * *

UNITED STATES PATENT AND TRADEMARK OFFICE
CERTIFICATE OF CORRECTION

| | | |
|---|---|---|
| PATENT NO. | : 7,933,983 B2 | Page 1 of 1 |
| APPLICATION NO. | : 10/320461 | |
| DATED | : April 26, 2011 | |
| INVENTOR(S) | : Doug Steele et al. | |

It is certified that error appears in the above-identified patent and that said Letters Patent is hereby corrected as shown below:

In column 14, line 4, in Claim 2, delete "claims" and insert -- claim --, therefor.

In column 14, line 8, in Claim 3, delete "claims" and insert -- claim --, therefor.

In column 14, line 15, in Claim 4, delete "claims'" and insert -- claim --, therefor.

In column 14, line 23, in Claim 5, delete "claims" and insert -- claim --, therefor.

In column 16, line 43, in Claim 24, delete "claims" and insert -- claim --, therefor.

In column 16, line 50, in Claim 25, delete "claims" and insert -- claim --, therefor.

Signed and Sealed this
Thirteenth Day of September, 2011

David J. Kappos
*Director of the United States Patent and Trademark Office*